(12) United States Patent
Georgantas et al.

(10) Patent No.: US 8,280,315 B2
(45) Date of Patent: Oct. 2, 2012

(54) RF INTEGRATED CIRCUIT WITH TRANSMITTER AND MULTIPURPOSE OUTPUT PORTS AND METHODS FOR USE THEREWITH

(75) Inventors: Theodoros Georgantas, Haidari (GR); Konstantinos D. Vavelidis, Ilioupoli (GR); Sofoklis Plevridis, Glyfada (GR); Ilias Bouras, Ilioupolis (GR)

(73) Assignee: Broadcom Corporation, Irvine, CA (US)

(*) Notice: Subject to any disclaimer, the term of this patent is extended or adjusted under 35 U.S.C. 154(b) by 0 days.

(21) Appl. No.: 13/273,831

(22) Filed: Oct. 14, 2011

(65) Prior Publication Data
US 2012/0034950 A1  Feb. 9, 2012

Related U.S. Application Data

(63) Continuation of application No. 13/083,897, filed on Apr. 11, 2011, now Pat. No. 8,064,842, which is a continuation of application No. 12/118,853, filed on May 12, 2008, now Pat. No. 7,949,311.

(51) Int. Cl.
*H04B 1/44* (2006.01)

(52) U.S. Cl. .................................................. 455/73
(58) Field of Classification Search .............. 455/73, 455/75, 76, 78, 80, 82, 83, 86, 550.1, 552.1, 455/553.1, 313, 314
See application file for complete search history.

(56) References Cited

U.S. PATENT DOCUMENTS

7,512,388 B2 * 3/2009 Snider .................. 455/552.1
2004/0185795 A1 * 9/2004 Shamsaifar et al. ........... 455/83
* cited by examiner

*Primary Examiner* — Thanh Le
(74) *Attorney, Agent, or Firm* — Garlick & Markison; Bruce E. Stuckman (57) ABSTRACT

An RF integrated circuit (IC) includes a first IC port for coupling a first transmit signal in a first frequency band to at least one external device and a second IC port for coupling a second transmit signal in a second frequency band to the at least one external device. A transmitter module responds to outbound data to generate the first transmit signal in a first mode of operation and to generate the second transmit signal in a second mode of operation, wherein the transmitter module generates the first transmit signal and the second transmit signal in a selected one of a plurality of wireless telephony formats based on a control signal, and wherein the plurality of wireless telephony formats includes a UMTS format and at least one non-UMTS format.

16 Claims, 8 Drawing Sheets

RF INTEGRATED CIRCUIT WITH TRANSMITTER AND MULTIPURPOSE OUTPUT PORTS AND METHODS FOR USE THEREWITH

CROSS REFERENCE TO RELATED APPLICATIONS

The present U.S. Utility Patent Application claims priority pursuant to 35 U.S.C. §120, as a continuation, to U.S. patent application Ser. No. 13/083,897, entitled "RF INTEGRATED CIRCUIT WITH TRANSMITTER AND MULTIPURPOSE OUTPUT PORTS AND METHODS FOR USE THEREWITH," filed Apr. 11, 2011, pending, which is hereby incorporated herein by reference in its entirety and made part of the present U.S. Utility Patent Application for all purposes:

U.S. application Ser. No. 13/083,897 claims priority pursuant to 35 U.S.C. §120, as a continuation, to U.S. patent application Ser. No. 12/118,853, entitled "RF INTEGRATED CIRCUIT WITH TRANSMITTER AND MULTIPURPOSE OUTPUT PORTS AND METHODS FOR USE THEREWITH," issued as U.S. Pat. No. 7,949,311 on May 24, 2011 which is hereby incorporated herein by reference in its entirety and made part of the present U.S. Utility Patent Application for all purposes.

BACKGROUND OF THE INVENTION

1. Technical Field of the Invention

This invention relates generally to mobile communication devices and more particularly to a circuit for transmitters implemented via RF integrated circuits.

2. Description of Related Art

Communication systems are known to support wireless and wire line communications between wireless and/or wire line communication devices. Such communication systems range from national and/or international cellular telephone systems to the Internet to point-to-point in-home wireless networks. Each type of communication system is constructed, and hence operates, in accordance with one or more communication standards.

Depending on the type of wireless communication system, a wireless communication device, such as a cellular telephone, two-way radio, personal digital assistant (PDA), personal computer (PC), laptop computer, home entertainment equipment, RFID reader, RFID tag, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system or a particular RF frequency for some systems) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

As is also known, the receiver is coupled to the antenna through an antenna interface and includes a low noise amplifier, one or more intermediate frequency stages, a filtering stage, and a data recovery stage. The low noise amplifier (LNA) receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

RF transmitters can generate polar coordinate transmissions that are simultaneously amplitude modulated and phase modulated to carry more data over a single transmitted signal. The modulation can be performed in two phases with phase modulation occurring first in a phase locked loop and amplitude modulation being induced on the phase modulated signal by the power amplifier.

Wireless communication systems may operate in accordance with different standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), radio frequency identification (RFID), and/or variations thereof. The construction of multi-format devices can be a challenge to designers that wish to simplify their designs and make them more efficient. Further limitations and disadvantages of conventional and traditional approaches will become apparent to one of ordinary skill in the art through comparison of such systems with the present invention.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

DETAILED DESCRIPTION OF THE INVENTION

Figure 1:
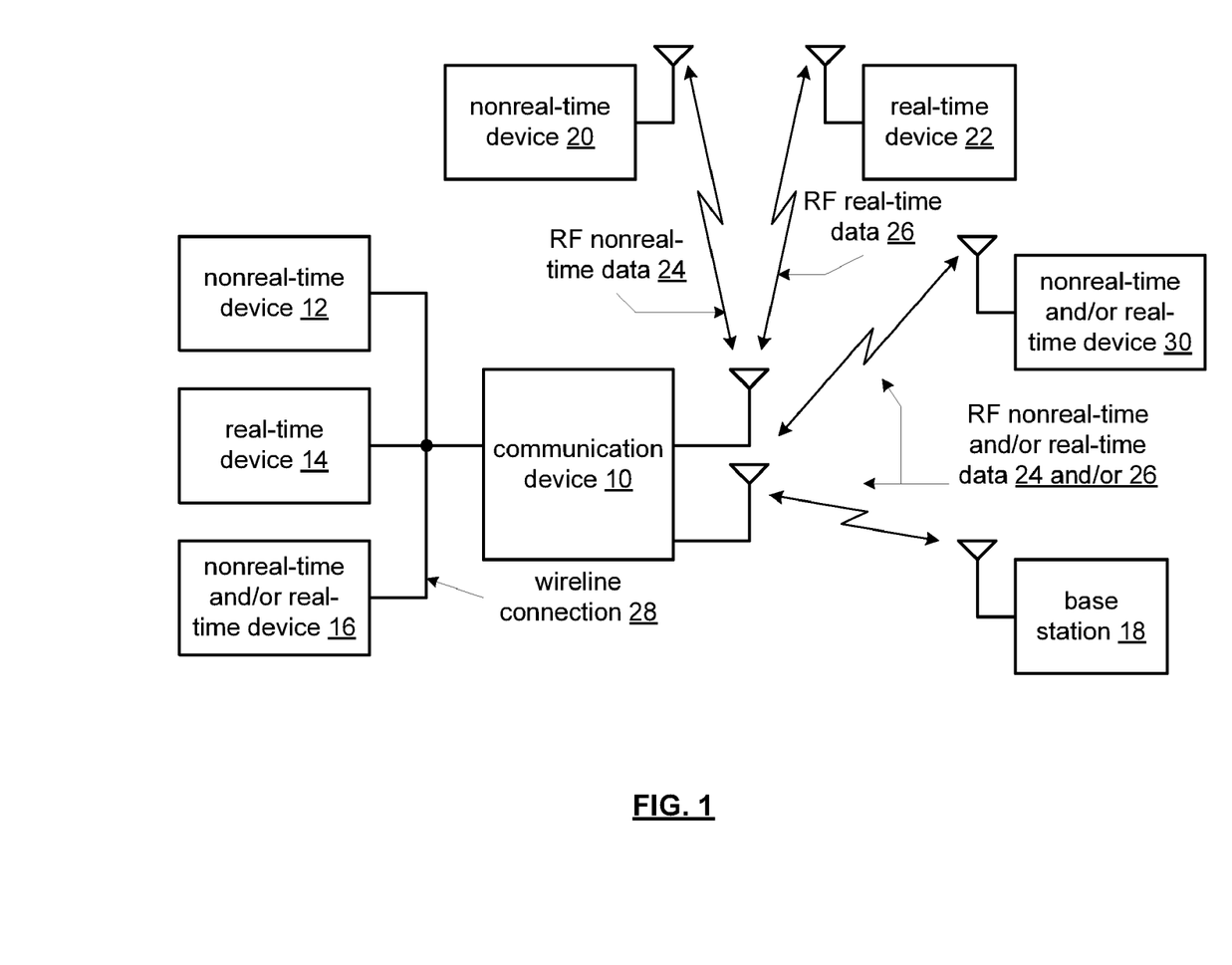
FIG. 1 is a schematic block diagram of an embodiment of a communication system in accordance with the present invention.

FIG. 1 is a schematic block diagram of an embodiment of a communication system in accordance with the present invention. In particular a communication system is shown that includes a communication device 10 that communicates real-time data 24 and non-real-time data 26 wirelessly with one or more other devices such as base station 18, non-real-time device 20, real-time device 22, and non-real-time and/or real-time device 30. In addition, communication device 10 can also optionally communicate over a wireline connection with non-real-time device 12, real-time device 14 and non-real-time and/or real-time device 16.

In an embodiment of the present invention the wireline connection 28 can be a wired connection that operates in accordance with one or more standard protocols, such as a universal serial bus (USB), Institute of Electrical and Electronics Engineers (IEEE) 488, IEEE 1394 (Firewire), Ethernet, small computer system interface (SCSI), serial or parallel advanced technology attachment (SATA or PATA), personal computer memory card international association (PCMCIA) or other wired communication protocol, either standard or proprietary.

The wireless connection can communicate in accordance with a wireless network protocol such as IEEE 802.11, Bluetooth, Ultra-Wideband (UWB), WIMAX, or other wireless network protocol, a wireless telephony data/voice protocol such as Global System for Mobile Communications (GSM), General Packet Radio Service (GPRS), Enhanced Data Rates for Global Evolution (EDGE), Personal Communication Services (PCS), or a code division multiple access (CDMA) protocol such as wideband CDMA (WCDMA) other wireless telephony protocol or other wireless communication protocol, either standard or proprietary. In particular, communication device 10 is capable of communicating over two or more different frequency bands such as the 750, 850, 900, 1800 or 1900 MHz bands or other frequency bands. For instance, communication device 10 can communicate via a 900 MHz band with base station 18 and/or non-real-time and/or real-time device 30 and communicate via an 1800 MHz band with non-real-time device 20 and/or real-time device 22. Further, the wireless communication path can include separate transmit and receive paths that use separate carrier frequencies and/or separate frequency channels. Alternatively, a single frequency or frequency channel can be used to bi-directionally communicate data to and from the communication device 10.

Communication device 10 can be a mobile phone such as a cellular telephone, a PC data card that communicates over a wireless telephony network, a personal digital assistant, game console, personal computer, laptop computer, or other device that performs one or more functions that include communication of voice and/or data via the wireless communication path. In an embodiment of the present invention, the real-time and non-real-time devices 12, 14, 16, 18, 20, 22, and 30 can be base stations, access points, or other communication devices such as personal computers, laptops, PDAs, mobile phones, cellular telephones, devices equipped with wireless local area network or Bluetooth transceivers, FM tuners, TV tuners, digital cameras, digital camcorders, or other devices that either produce, process or use audio, video signals or other data or communications.

In operation, the communication device includes one or more applications that include voice communications such as standard telephony applications, voice-over-Internet Protocol (VoIP) applications, local gaming, Internet gaming, email, instant messaging, multimedia messaging, web browsing, audio/video recording, audio/video playback, audio/video downloading, playing of streaming audio/video, office applications such as databases, spreadsheets, word processing, presentation creation and processing and other voice and data applications. In conjunction with these applications, the real-time data 26 includes voice, audio, video and multimedia applications including Internet gaming, etc. The non-real-time data 24 includes text messaging, email, web browsing, file uploading and downloading, etc.

In an embodiment of the present invention, the communication device 10 includes an integrated circuit, such as an RF integrated circuit that includes one or more features or functions of the present invention. Such integrated circuits shall be described in greater detail in association with FIGS. 2-8 that follow.

Figure 2:
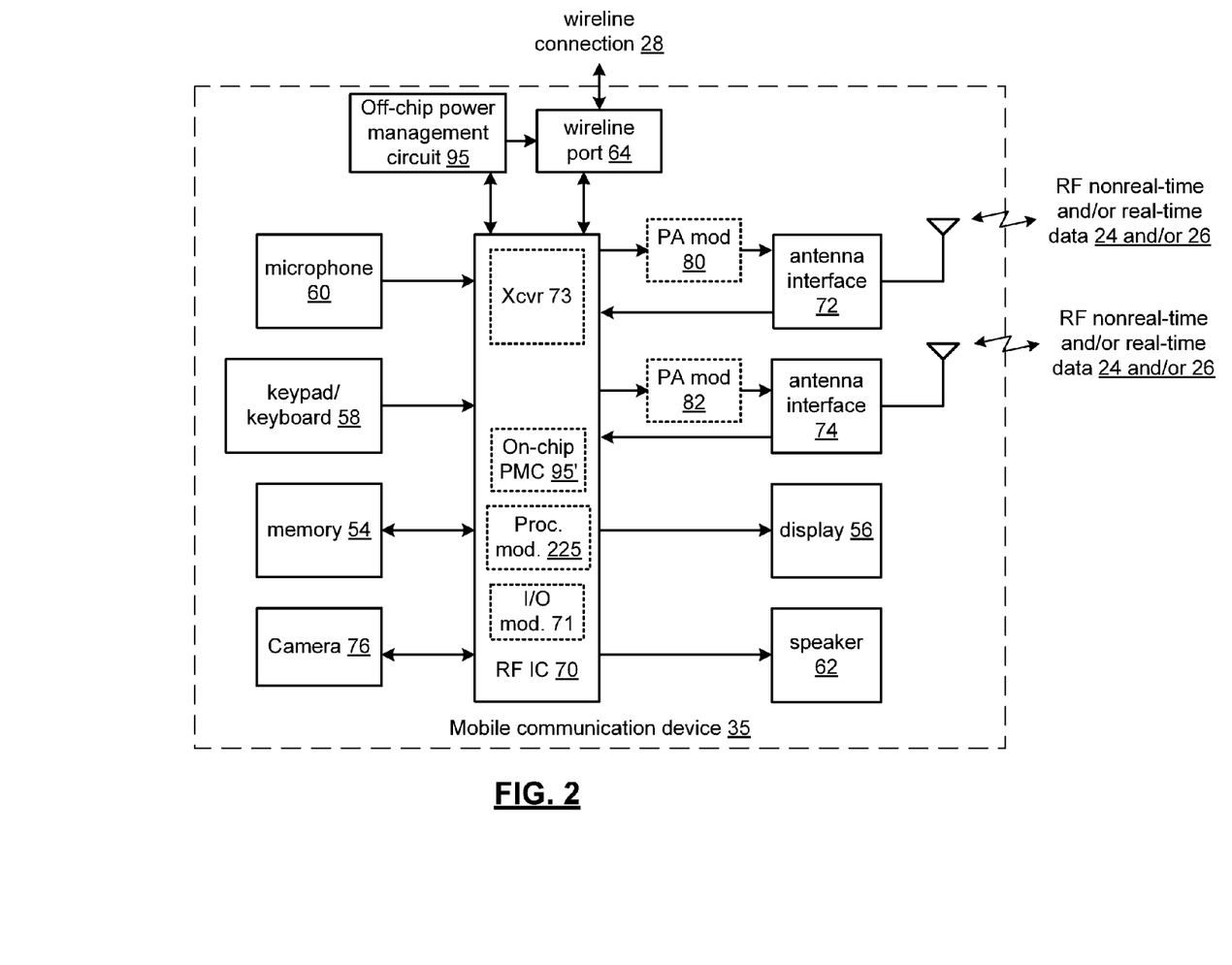
FIG. 2 is a schematic block diagram of an embodiment of a communication device in accordance with the present invention.

FIG. 2 is a schematic block diagram of an embodiment of an integrated circuit in accordance with the present invention. A voice and data RF integrated circuit (IC) 70 is shown that implements mobile communication device 35, such as an embodiment of communication device 10, in conjunction with microphone 60, keypad/keyboard 58, memory 54, speaker 62, display 56, camera 76, antenna interface 52 and wireline port 64. In addition, RF IC 70 includes a transceiver 73 with RF and baseband modules for formatting and modulating data and voice signals into RF real-time data 26 and non-real-time data 24 and transmitting this data via optional off-chip power amplifier modules 80 and 82 and antenna interfaces 72 and 74 coupled to corresponding antennas, and for receiving RF data and RF voice signals via these antennas. A particular structure is shown that operates in two different frequency bands via separate optional power amplifier modules (80, 82), antenna interfaces (72, 74) and antennas, however one more shared multi-band components can likewise be employed.

Further, RF IC 70 includes an input/output module 71 with appropriate encoders and decoders for communicating via the wireline connection 28 via wireline port 64, an optional memory interface for communicating with off-chip memory 54, a codec for encoding voice signals from microphone 60 into digital voice signals, a keypad/keyboard interface for generating data from keypad/keyboard 58 in response to the actions of a user, a display driver for driving display 56, such as by rendering a color video signal, text, graphics, or other display data, and an audio driver such as an audio amplifier for driving speaker 62 and one or more other interfaces, such as for interfacing with the camera 76 or the other peripheral devices.

Off-chip power management circuit 95 includes one or more DC-DC converters, voltage regulators, current regulators or other power supplies for supplying the RF IC 70 and optionally the other components of mobile communication device 35 and/or its peripheral devices with supply voltages and or currents (collectively power supply signals) that may be required to power these devices. Off-chip power management circuit 95 can operate from one or more batteries, line power and/or from other power sources, not shown. In particular, off-chip power management module can selectively supply power supply signals of different voltages, currents or current limits or with adjustable voltages, currents or current limits in response to power mode signals received from the voice data RF IC 70. RF IC 70 optionally includes an on-chip power management circuit 95' for replacing the off-chip power management circuit 95.

In an embodiment of the present invention, the RF IC 70 is a system on a chip integrated circuit that includes at least one processing device. Such a processing device, for instance, processing module 225, may be a microprocessor, microcontroller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The associated memory may be a single memory device or a plurality of memory devices that are either on-chip or off-chip such as memory 54. Such a memory device may be a read-only memory, random access memory, volatile memory, non-volatile memory, static memory, dynamic memory, flash memory, and/or any device that stores digital information. Note that when the RF IC 70 implements one or more of its functions via a state machine, analog circuitry, digital circuitry, and/or logic circuitry, the associated memory storing the corresponding operational instructions for this circuitry is embedded with the circuitry comprising the state machine, analog circuitry, digital circuitry, and/or logic circuitry.

In operation, the RF IC 70 executes operational instructions that implement one or more of the applications (real-time or non-real-time) attributed to communication devices 10 as discussed in conjunction with FIG. 1. Further, transceiver 73 includes a transmitter module in accordance with the present invention as will be described in conjunction with FIG. 3.

Figure 3:
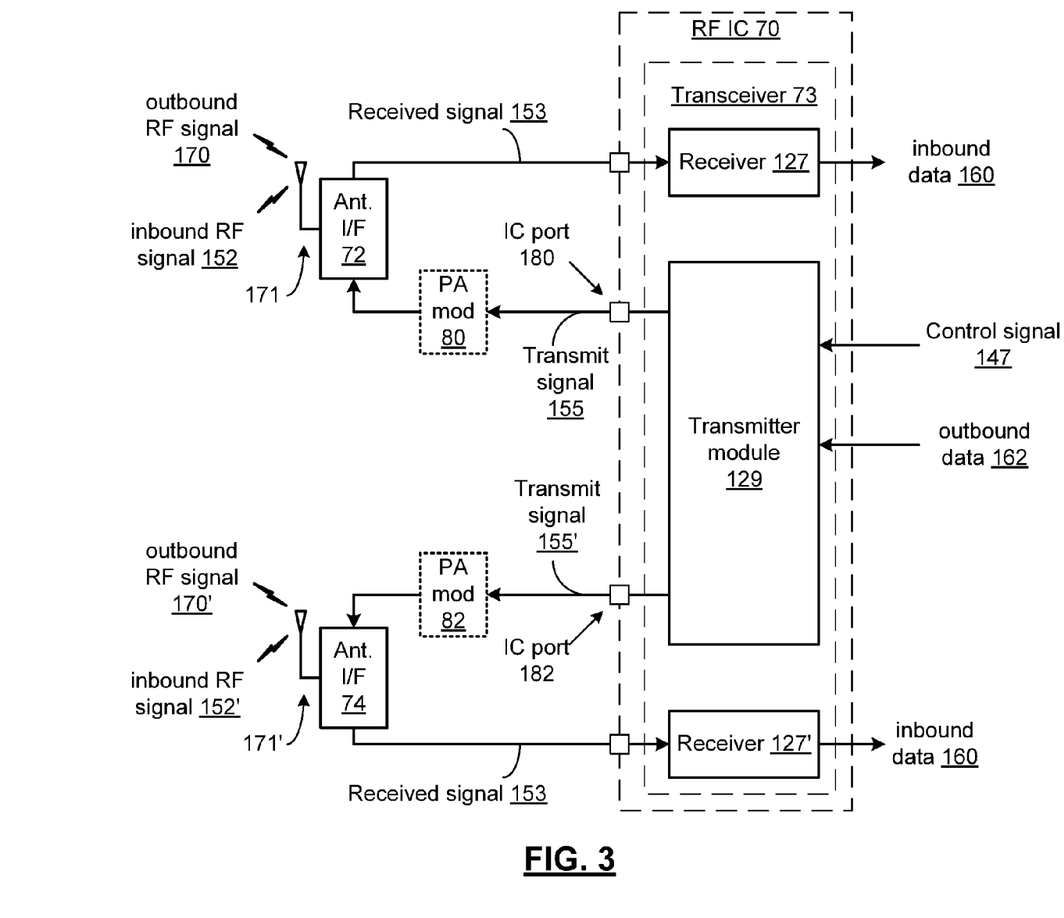
FIG. 3 is a schematic block diagram of an embodiment of an RF transceiver in accordance with the present invention.

FIG. 3 is a schematic block diagram of an embodiment of an RF transceiver in accordance with the present invention. In particular, transceiver 73 of RF IC 70 is shown along with other external components of mobile communication device 35 including antenna interfaces (72, 74) and antennas (171, 171') and optional power amplifier modules (80, 82). Inbound RF signals 152 are received via the antenna 171 and antenna interface 72 to produce received signal 153. In turn, receiver 127 generates inbound data 160 for processing in accordance with one or more applications of mobile communications of device 35. In addition, inbound data 160 can also be generated by receiver 127' based on received signals 153' produced from inbound RF signal 152' via antenna 171' and antenna interface 74.

Transmitter module 129 responds to outbound data 162 to generate the transmit signal 155 in a first frequency band in a first mode of operation. In a second mode of operation, transmitter module 129 generates the transmit signal 155' in a second frequency band. As discussed in conjunction with FIG. 1, the first and second frequency bands can be chosen from the 750, 850, 900, 1800, 1900 MHz bands or other frequency bands corresponding to other frequencies and selected in response to control signal 147. Further, in response to control signal 147, the transmitter module 129 generates the transmit signal 155 and/or 155' in a selected one of a plurality of wireless telephony formats, such as WCDMA or one or more other CDMA formats, GSM, EDGE, universal mobile telecommunication system (UMTS), high-speed packet access (HSPA) and/or other wireless telephony formats (either CDMA or non-CDMA). In an embodiment of the present invention, control signal 147 is generated by a processor such as processor 225 of RF IC 70 in accordance with a wireless telephony application. However, control signal 147 can optionally be generated by other elements of mobile communication device 35.

The RF IC 70 includes an IC port 180 for coupling a transmit signal 155 in a first frequency band to optional power amplifier module 80, antenna interface 72 and antenna 171 that are external to the RF IC 70. Similarly, IC port 182 couples transmit signal 155' in a second frequency band to optional power amplifier module 82, antenna interface 74 and antenna 171'. The IC ports 180 and 182 can be input/output (I/O) pins, pads or other ports for connecting the RF IC 70 to external devices, via a circuit board, socket or other connection. It should be noted that the flexible multi-format configuration of transmitter module 129 allows RF IC 70 to couple to the optional power amplifiers (80, 82) and external antenna structure with only two ports, saving additional ports of the RF IC 70 for other I/O.

The optional power amplifier module 80 amplifies the transmit signal 155 to ultimately produce outbound RF signal 170 via antenna interface 72. The antenna 171 transmits the outbound RF signals 170 to a targeted device such as a base station, an access point and/or another wireless communication device. Similarly, the optional power amplifier module 82 amplifies the transmit signal 155' to ultimately produce outbound RF signal 170' via antenna interface 74. The antenna 171' transmits the outbound RF signals 170' to a targeted device such as a base station, an access point and/or another wireless communication device.

Antenna interfaces 72 and 74 can each include a transmit/receive switch, a duplexer/diplexer, an impedance matching network and/or a filter. Further, while antennas 171 and 171' are shown as single shared antennas, the receivers 127 and 127' may each employ separate antennas or share a multiple antenna structure that includes two or more antennas. In another embodiment, the receiver 127, 127' and/or transmitter module 129 may share a multiple input multiple output (MIMO) antenna structure that includes a plurality of antennas. Each antenna may be fixed, programmable, an antenna array or other antenna configuration.

Figure 4:
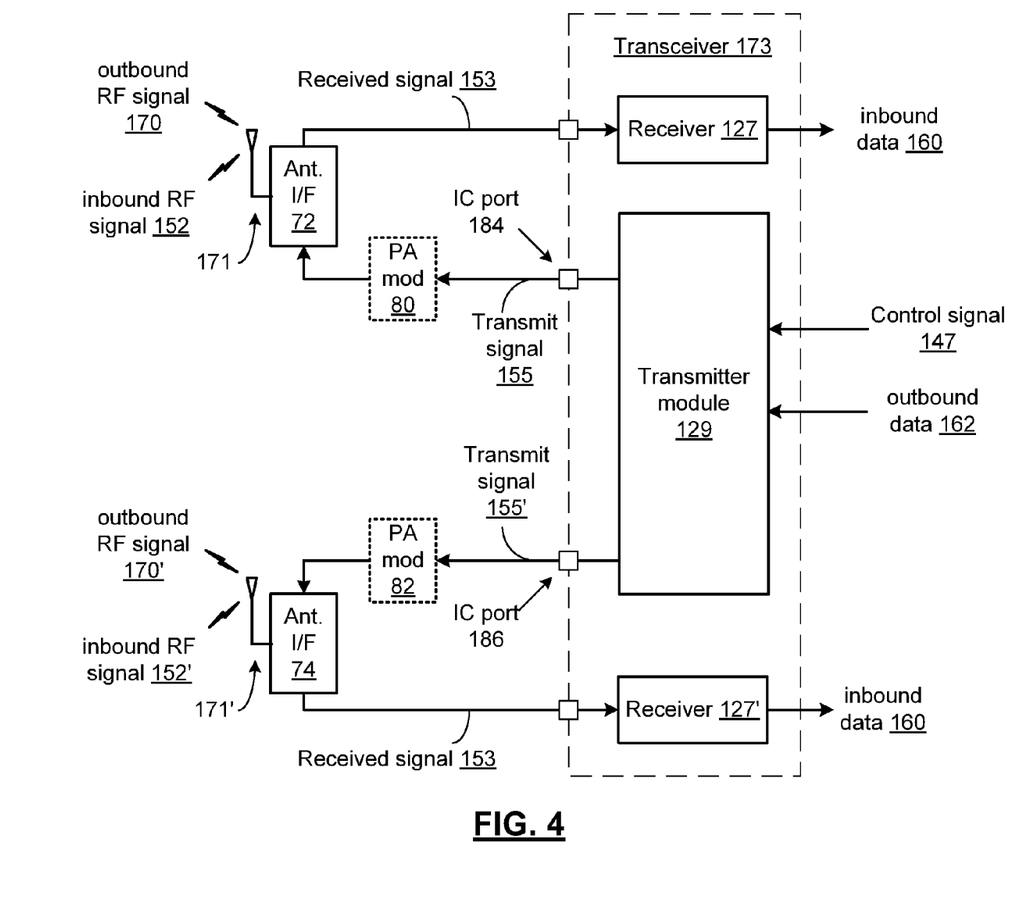
FIG. 4 is a schematic block diagram of another embodiment of an RF transceiver in accordance with the present invention.

FIG. 4 is a schematic block diagram of another embodiment of an RF transceiver in accordance with the present invention. In particular, an embodiment is shown that operates similarly to the embodiment of FIG. 3 with similar elements being referred to by common reference numerals. In this embodiment however, transceiver 173 is itself a stand alone RF IC that includes receivers 127 and 127' and transmitter module 129. Transceiver 173 can perform all of the functions transceiver 73 discussed in conjunction with RF IC 70, but be included in a separate RF IC.

The transceiver 173 includes an IC port 184 for coupling a transmit signal 155 in a first frequency band to optional power amplifier module 80, antenna interface 72 and antenna 171 that are external to the transceiver 173. Similarly, IC port 186 couples transmit signal 155' in a second frequency band to optional power amplifier module 82, antenna interface 74 and antenna 171'. The IC ports 184 and 186 can be input/output (I/O) pins, pads or other ports for connecting the transceiver 173 to external devices, via a circuit board, socket or other connection. It should be noted that the flexible multi-format configuration of transmitter module 129 allows transceiver 173 to couple to the optional power amplifiers (80, 82) and external antenna structure with only two ports, saving additional ports of the transceiver 173 for other I/O.

Figure 5:
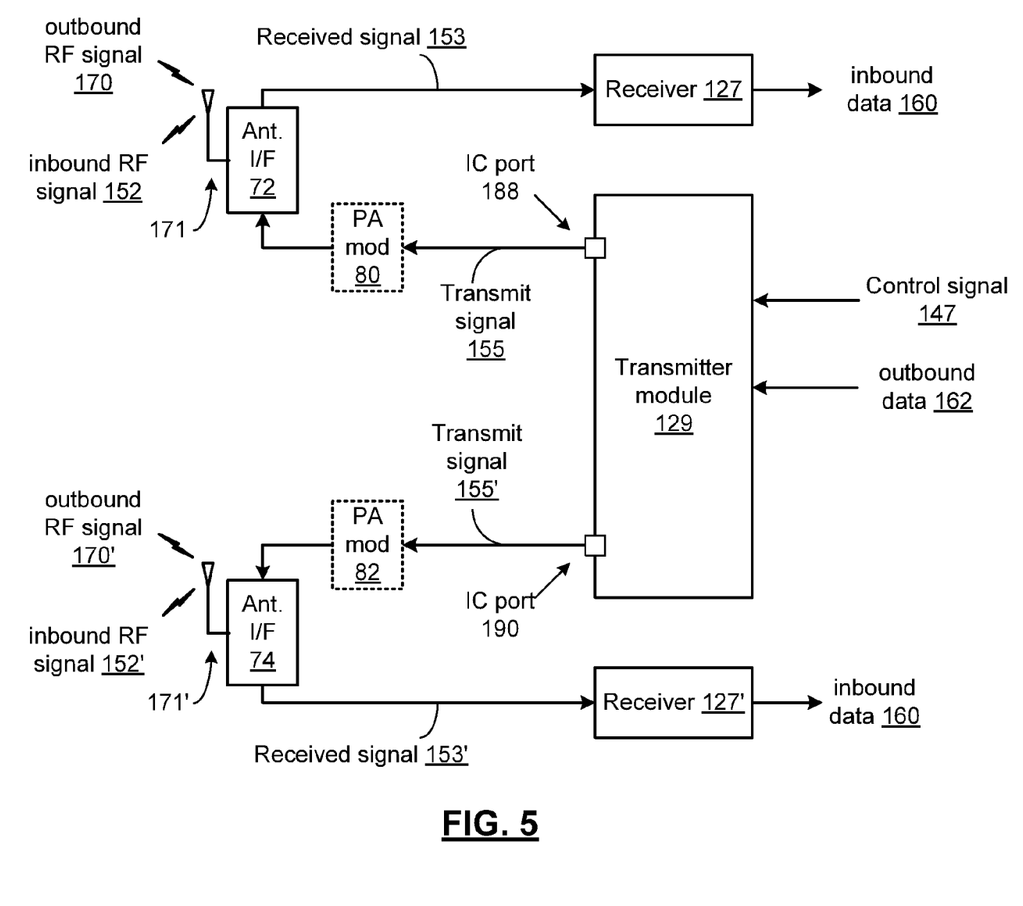
FIG. 5 is a schematic block diagram of another embodiment of an RF transceiver in accordance with the present invention.

FIG. 5 is a schematic block diagram of another embodiment of an RF transceiver in accordance with the present invention. In particular, an embodiment is shown that operates similarly to the embodiments of FIGS. 3-4 with similar elements being referred to by common reference numerals. In this embodiment however, transmitter module 129 is itself a stand alone RF IC.

The transmitter module 129 includes an IC port 188 for coupling a transmit signal 155 in a first frequency band to optional power amplifier module 80, antenna interface 72 and antenna 171 that are external to the transmitter module 129. Similarly, IC port 190 couples transmit signal 155' in a second frequency band to optional power amplifier module 82, antenna interface 74 and antenna 171'. The IC ports 188 and 190 can be input/output (I/O) pins, pads or other ports for connecting the transmitter module 129 to external devices, via a circuit board, socket or other connection. It should be noted that the flexible multi-format configuration allows transmitter module 129 to couple to the optional power amplifiers (80, 82) and external antenna structure with only two ports, saving additional ports of the transmitter module 129 for other I/O.

Figure 6:
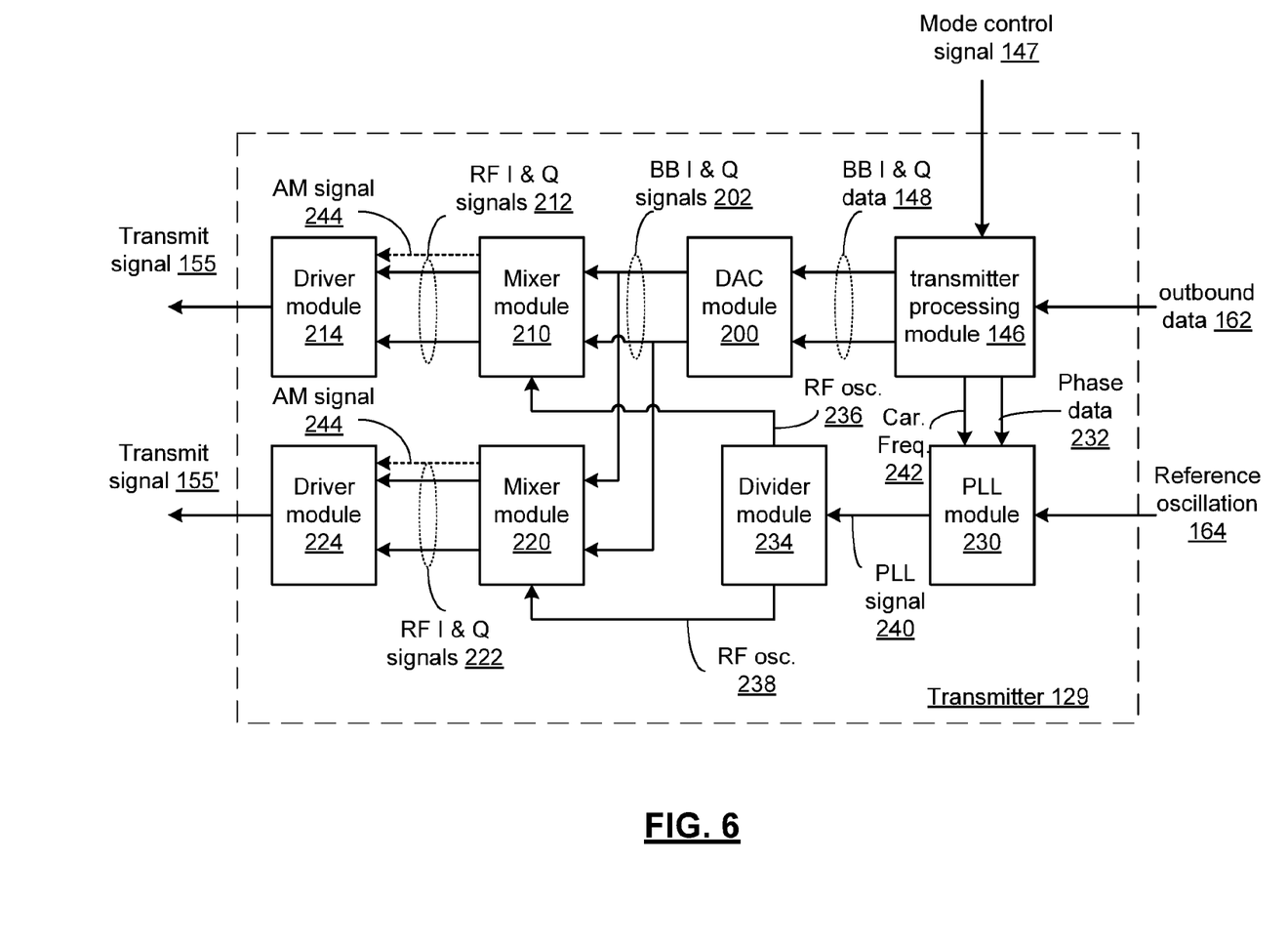
FIG. 6 is a schematic block diagram of an embodiment of an RF transmitter in accordance with the present invention.

FIG. 6 is a schematic block diagram of an embodiment of an RF transmitter in accordance with the present invention. Transmitter module 129 includes transmitter processing module 146, digital to analog converter (DAC) module 200, mixer modules 210 and 220, driver modules 214 and 224, divider module 234 and phase-locked loop (PLL) module 230. The transmitter processing module 146, DAC module 200, Mixer modules 210 and 220 and driver modules 214 and 224 are each capable of operating in a mixed signal environment with in-phase (I) and quadrature-phase (Q) components.

In operation, transmitter processing module 146, generates baseband data, such as baseband I & Q data 148 and/or phase data 232 in response to the outbound data 162. In particular, transmitter processing module 146 responds to a format selection indicated by the control signal 147 to generate baseband data in accordance with the particular wireless telephony format selected (e.g., WCDMA, GSM, EGDE, etc.). While described as "baseband", this baseband data can be either at true baseband (zero intermediate frequency (IF)) or at some low IF, such a few MHz or less.

Note that the processing performed by the transmitter processing module 146 can include, but is not limited to, scrambling, encoding, puncturing, mapping, modulation, and/or digital baseband to IF conversion. Further note that the transmitter processing module 146 may be implemented using a shared processing device, individual processing devices, or a plurality of processing devices and may further include memory. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory may be a single memory device or a plurality of memory devices. Such a memory device may be a read-only memory, random access memory, volatile memory, non-volatile memory, static memory, dynamic memory, flash memory, and/or any device that stores digital information. Note that when the processing module 146 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

The digital-to-analog conversion (DAC) module 200 can include a digital to analog converter, a filter, such as a smoothing filter and/or gain module. The DAC module 200 converts the baseband I & Q signals 148 from the digital domain to the analog domain. The filter and/or gain module filters and/or adjusts the gain of the analog signals to produce baseband I & Q signals 202, that are provided to the mixer modules 210 and 220 for up-conversion to RF.

Phase-locked loop (PLL) module 230 generates a PLL signal 240 based on a reference oscillation 164 from a crystal, digital RF synthesizer or other frequency reference generation device and based on a particular carrier frequency 242 selected by transmitter processing model 146 in accordance with the particular wireless telephony format that has been selected. Divider module 234 produces two local oscillation signals, RF oscillation 236 and RF oscillation 238 for use by mixer modules 210 and 220 in upconverting the baseband I & Q signals 202 to their required carrier frequencies. In addition divider module 234 can include one or more simple dividers, or fractional dividers for producing the necessary local oscillation frequencies to track the desired carrier frequencies of the transmit signals 155 and 155', based on any IF frequency employed as discussed above in conjunction with transmitter processing module 146.

Mixer module 210 converts the baseband I & Q signals 202 into RF I & Q signals 212 based on the RF oscillation 236. Mixer module 220 converts the baseband I & Q signals 202 into RF I & Q signals 222 based on the RF oscillation 238. An example implementation of a mixer module is presented in conjunction with FIG. 7 that follows.

Driver modules 214 and 224 include can pre-amplifiers for producing transmit signals 155 and 155' that driver optional off-chip power amplifier modules 80 and 82. Alternatively driver modules 214 and 224 further include their own on-chip power amplifiers in place of the optional off-chip power amplifiers 80 and 82. The pre-amplifier and/or power amplifier can include a polar amplification stage capable of amplitude modulating a phase modulated input signal, based on AM signal 244, to produce an amplitude and phase modulated signal. Driver modules 214 and 224 can optionally include a transmit filter module for attenuating unwanted spurs and harmonics.

Depending on the selected wireless telephony format, the transmitter processing module 146 can generate the baseband data as I and Q data 148, used in the I and Q path formed by DAC module 200, mixer modules 210 and 220 and driver module 214 and 224 to generate amplitude and phase modulated transmit signals 155 and 155'. Alternatively, transmitter processing module 146 can generate all or a portion of the baseband data as phase data 232 for directly phase modulating the PLL signal 240 that produces the RF oscillations 236 and 238, to generate amplitude and phase modulated transmit signals 155 and 155'.

For example, when a WCDMA format is selected, transmitter processing module 146 can generate baseband I and Q data 148 and transmitter module 129 can operate using the I and Q path formed by DAC module 200, mixer modules 210 and 220 and driver module 214 and 224 to generate amplitude and phase modulated transmit signals 155 and 155'. If an EDGE format is selected, transmitter processing module 146 can either generate baseband I and Q data 148 and transmitter module 129 can operate using the I and Q path formed by DAC module 200, mixer modules 210 and 220 and driver module 214 and 224 to generate amplitude and phase modulated transmit signals 155 and 155', or, in EDGE format operation, an AM signal will be transmitted instead of the in-phase signals. In the latter case, transmitter processing module 146 will generate phase data 232 that is used by PLL module 230 to generate a phase modulated PLL signal 240. In particular, baseband I and Q data 202 can include AM data and baseband I and Q signals can include AM signals 244 that can be passed to mixer modules 210 and 220 to produce a polar transmission. The driver modules 214 and 224 will further amplify the signal.

Further, if a GSM format is selected, transmitter processing module 146 can generate phase data 232 that is used by PLL module 230 to generate a phase modulated PLL signal 240. The mixer modules 210, 220 and driver modules 214 and 224 can be operated in saturation to directly couple and amplify these phase modulated signals to produce transmit signals 155 and/or 155' at their respective frequencies. By using common transmitter elements in processing selected formats, redundant components can be eliminated and integrated circuit real estate can be reduced.

While specific wireless telephony formats are discussed above, other wireless telephony formats can similarly be implemented using the transmitter processing module 129 described above. In addition, while two RF paths are shown for producing transit signals 155 and 155', additional RF paths can be included for use in conjunction with additional frequency bands.

Figure 7:
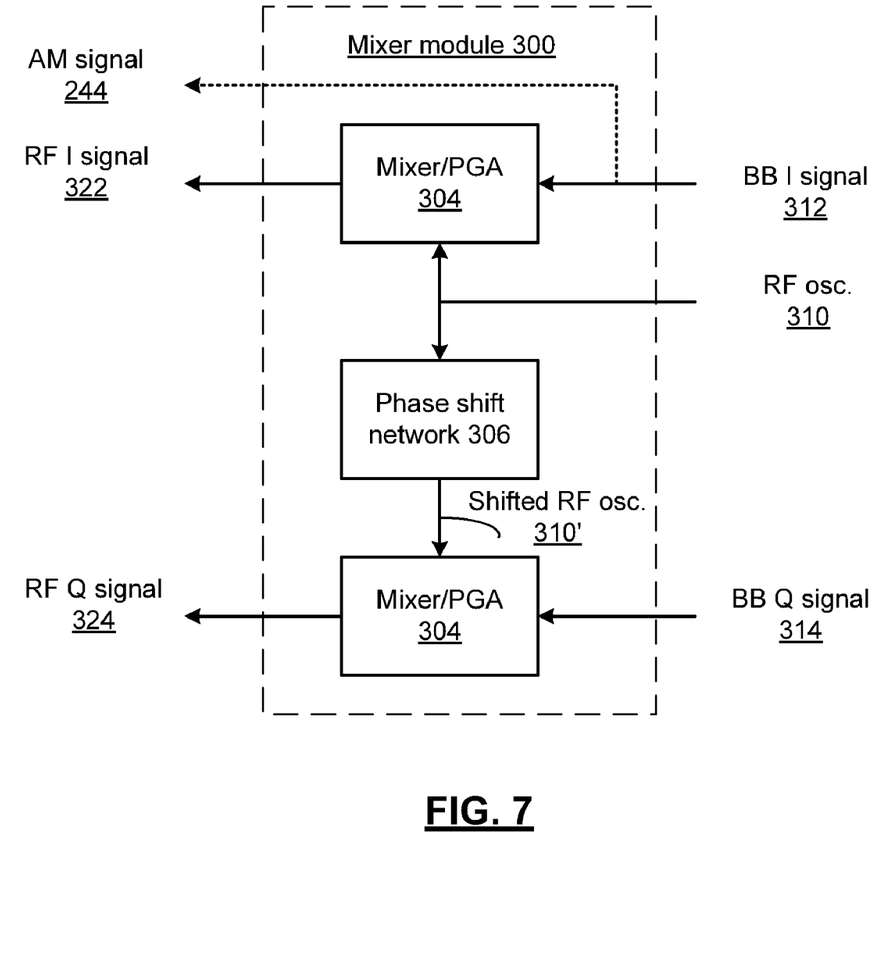
FIG. 7 is a schematic block diagram of an embodiment of a mixer module in accordance with the present invention.

FIG. 7 is a schematic block diagram of an embodiment of a mixer module in accordance with the present invention. In particular, mixer module 300 include a pair of mixer/programmable gain amplifiers 304 and a phase shift network 306 that produces a 90-degree phase shift that operate to mix the baseband I and Q signals (312, 314) (such as baseband I and Q signals 202) with the RF oscillation 310 to produce RF I and Q signals (322, 324) (such as RF I and Q signals 212). For certain selected formats, such as the GSM format example described in conjunction with FIG. 6, the Mixer/PGAs 304 can be operated in saturation to directly pass an RF oscillation 310 that has already been phase modulated. In addition, when baseband I signal 312 includes an AM signal 244 for polar transmission, such as in the EDGE example discussed in conjunction with FIG. 6, the AM signal 244 is passed to mixer and a power amplifier or pre-power amplifier, such as driver module 214 and/or 224 discussed in conjunction with FIG. 6.

Figure 8:
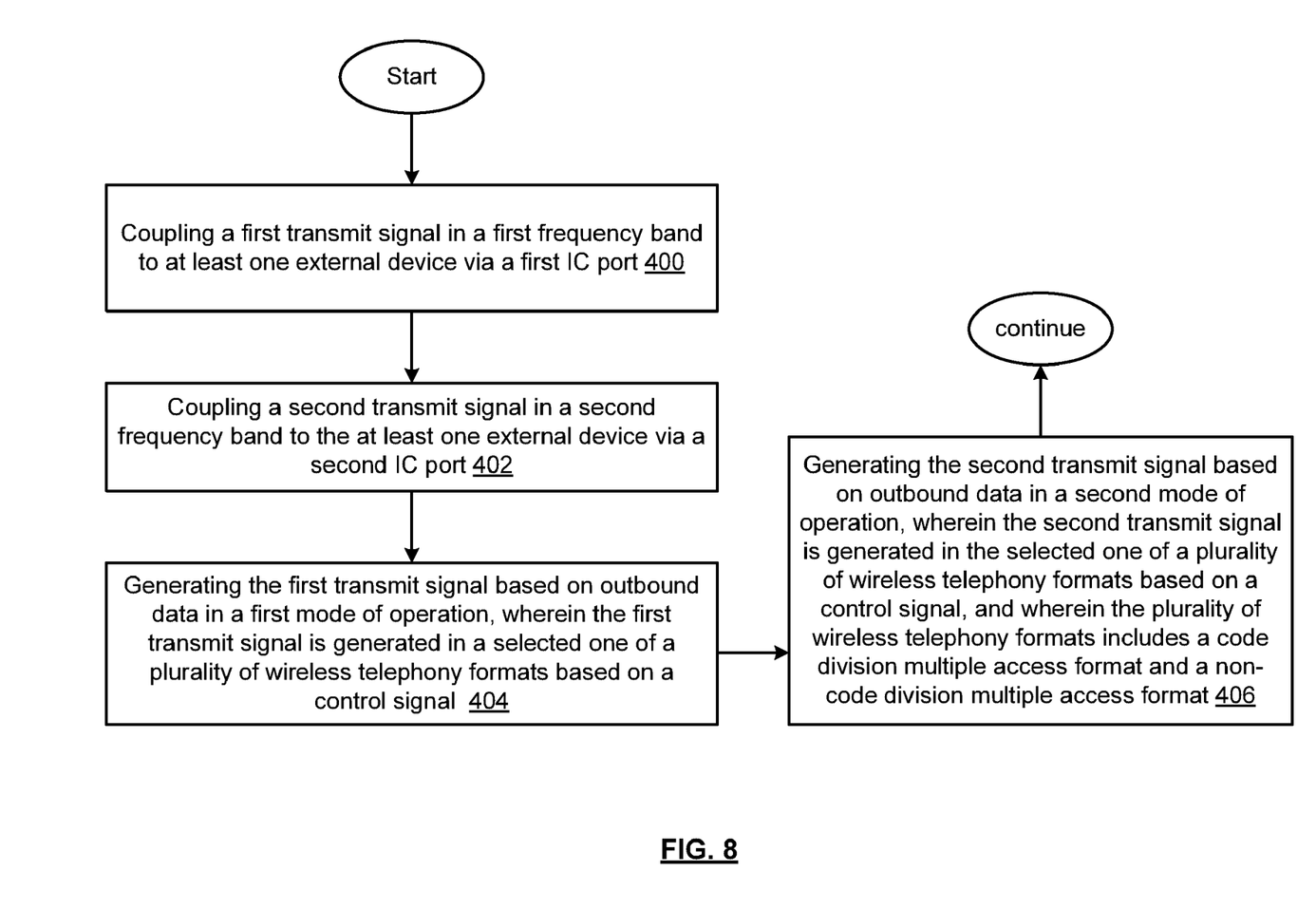
FIG. 8 is a flow chart of an embodiment of a method in accordance with the present invention.

FIG. 8 is a flow chart of an embodiment of a method in accordance with the present invention. In particular, a method is presented for use in conjunction with one or more of the functions and features described in conjunction with FIGS. 1-7. In step 400, a first transmit signal in a first frequency band is coupled to at least one external device via a first IC port. In step 402, a second transmit signal in a second frequency band is coupled to the at least one external device via a second IC port. In step 404, the first transmit signal is generated based on outbound data in a first mode of operation, wherein the first transmit signal is generated in a selected one of a plurality of wireless telephony formats based on a control signal. In step 406, the second transmit signal is generated based on the outbound data in a second mode of operation, wherein the second transmit signal is generated in the selected one of the plurality of wireless telephony formats based on the control signal and wherein the plurality of wireless telephony formats includes a code divisional multiple access format and at least one non-code division multiple access format.

In an embodiment of the present invention, the code divisional multiple access format includes a wideband code divisional multiple access format. The non-code divisional multiple access format can includes a GSM Association format, such as a GSM or EDGE format. The plurality of wireless telephony formats can include three or more wireless telephony formats.

In an embodiment of the present invention, step 404 includes: generating baseband data in response to the outbound data and based on the control signal; generating at least one baseband signal in response to the baseband data; generating at least one first RF signal based on the at least one baseband signal and a first RF oscillation; and generating the first transmit signal, based on the first RF signal. Step 408 can include: generating at least one second RF signal based on the at least one baseband signal and a second RF oscillation; and generating the second transmit signal, based on the second RF signal, wherein when the code division multiple access format is selected, the baseband data includes in-phase and quadrature-phase data, the at least one baseband signal includes in-phase and quadrature-phase signals, and the at least one first RF signal includes in-phase and quadrature-phase first RF signals, and wherein the at least one second RF signal includes in-phase and quadrature-phase second RF signals.

Step 406 can further include: generating a phase locked loop (PLL) signal based on a reference oscillation; and generating the first RF oscillation based on the PLL signal. Step 406 can further include generating the second RF oscillation based on the PLL signal.

When the GSM format is selected, the baseband data can include phase data, and the PLL signal can be phase modulated based on the phase data. When the EDGE format is selected, the baseband data can either include in-phase and quadrature-phase data, or the baseband data can include amplitude modulation (AM) data and phase modulated (PM) data, the at least one baseband signal includes an AM signal, the PLL signal can be phase modulated based on the phase data, and the at least one first RF signal can be amplitude modulated based on the AM signal, and the at least one second RF signal can be amplitude modulated based on the AM signal.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. While the term phase modulation is used herein it includes the equivalent frequency modulation.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. An RF integrated circuit (IC) comprising:
   a first IC port for coupling a first transmit signal in a first frequency band to at least one external device;
   a second IC port for coupling a second transmit signal in a second frequency band to the at least one external device; and
   a transmitter module, coupled to the first IC port and the second IC port, that responds to outbound data to generate the first transmit signal in a first mode of operation and to generate the second transmit signal in a second mode of operation, wherein the transmitter module generates the first transmit signal and the second transmit signal in a selected one of a plurality of wireless telephony formats based on a control signal, and wherein the plurality of wireless telephony formats includes a universal mobile telecommunication system (UMTS) format and at least one non-UMTS format.

2. The RF IC of claim 1 wherein the non-UMTS format includes a global system for mobile communication (GSM) format.

3. The RF IC of claim 2 wherein, when the non-UMTS format is selected, the baseband data includes phase data, and wherein the PLL signal is phase modulated based on the phase data.

4. The RF IC of claim 2 wherein the GSM format includes an enhanced data rates for GSM evolution (EDGE) format, wherein, when the EDGE format is selected, the baseband data includes amplitude modulation (AM) data, the at least one baseband signal includes an AM signal, wherein the first driver module includes at least one first polar amplifier for generating an amplitude modulation on the at least one first RF signal, based on the AM signal; and wherein the second driver module includes at least one polar amplifier for generating an amplitude modulation on the at least one second RF signal, based on the AM signal.

5. The RF IC of claim 1 wherein the non-UMTS format includes a high-speed packet access format.

6. The RF IC of claim 1 wherein the plurality of wireless telephony formats includes at least three wireless telephony formats.

7. The RF IC of claim 1 wherein the transmitter module includes:
   a transmitter processing module that generates baseband data in response to the outbound data and based on the control signal;
   a digital to analog converter module, coupled to the transmitter processing module, that generates at least one baseband signal in response to the baseband data;
   at first mixer module, coupled to the digital to analog converter module, that generates at least one first RF signal based on the at least one baseband signal and a first RF oscillation;
   a second mixer module, coupled to the digital to analog converter module, that generates at least one second RF signal based on the at least one baseband signal and a second RF oscillation;
   a first driver module, coupled to the first mixer module, that generates the first transmit signal, based on the first RF signal; and
   a second driver amplifier module, coupled to the second mixer module, that generates the second transmit signal, based on the second RF signal;
   wherein when at least one of the plurality of wireless telephony formats is selected, the baseband data includes in-phase and quadrature-phase data, the at least one baseband signal includes in-phase and quadrature-phase signals, and the at least one first RF signal includes in-phase and quadrature-phase first RF signals, and wherein the at least one second RF signal includes in-phase and quadrature-phase second RF signals.

8. The RF IC of claim 7 wherein the transmitter module further includes:
   a phase locked loop (PLL) module that generates a PLL signal based on a reference oscillation; and
   a divider module, coupled to the PLL module, that generates the first RF oscillation and the second RF oscillation based on the PLL signal.

9. The RF IC of claim 8 wherein the first driver module includes at least one of: a first pre-power amplifier and a first power amplifier, and wherein the second driver module includes at least one of: a first pre-power amplifier and a second power amplifier.

10. The RF IC of claim 1 wherein the first IC port includes one of: a first IC pin and a first IC pad, and wherein the second IC port includes one of: a second IC pin and a second IC pad.

11. A method for use in an RF integrated circuit (IC), the method comprising:
   coupling a first transmit signal in a first frequency band to at least one external device via a first IC port;
   coupling a second transmit signal in a second frequency band to the at least one external device via a second IC port;
   generating the first transmit signal based on outbound data in a first mode of operation, wherein the first transmit signal is generated in a selected one of a plurality of wireless telephony formats based on a control signal; and
   generating the second transmit signal based on the outbound data in a second mode of operation, wherein the second transmit signal is generated in the selected one of the plurality of wireless telephony formats based on the control signal;

wherein the plurality of wireless telephony formats includes a universal mobile telecommunication system (UMTS) format and at least one non-UMTS format.

12. The method of claim 11 wherein the non-UMTS format includes a global system for mobile communications (GSM).

13. The method of claim 11 wherein the non-UMTS format includes a high-speed packet access format.

14. The method of claim 11 wherein the plurality of wireless telephony formats includes at least three wireless telephony formats.

15. The method of claim 11 wherein the generating the first transmit signal includes:

generating baseband data in response to the outbound data and based on the control signal;

generating at least one baseband signal in response to the baseband data;

generating at least one first RF signal based on the at least one baseband signal and a first RF oscillation; and generating the first transmit signal, based on the first RF signal;

wherein generating the second transmit signal includes:

generating at least one second RF signal based on the at least one baseband signal and a second RF oscillation; and generating the second transmit signal, based on the second RF signal;

and wherein when at least one of the plurality of wireless telephony formats is selected, the baseband data includes in-phase and quadrature-phase data, the at least one baseband signal includes in-phase and quadrature-phase signals, and the at least one first RF signal includes in-phase and quadrature-phase first RF signals, and wherein the at least one second RF signal includes in-phase and quadrature-phase second RF signals.

16. The method of claim 15 wherein generating the first transmit signal further includes:

generating a phase locked loop (PLL) signal based on a reference oscillation; and generating the first RF oscillation based on the PLL signal;

and wherein generating the second transmit signal further includes:

generating the second RF oscillation based on the PLL signal.

* * * * *